BI-LEVEL AMPLIFIER AND CONTROL DEVICE

Filed Nov. 3, 1958 3 Sheets-Sheet 1

INVENTOR.
SEYMOUR R. CRAY
BY
Alexander & Dowell
ATTORNEYS

BI-LEVEL AMPLIFIER AND CONTROL DEVICE

Filed Nov. 3, 1958 3 Sheets-Sheet 2

INVENTOR.
SEYMOUR R. CRAY
BY
Alexander & Dowell
ATTORNEYS

BI-LEVEL AMPLIFIER AND CONTROL DEVICE

Filed Nov. 3, 1958 3 Sheets-Sheet 3

INVENTOR.
SEYMOUR R. CRAY
BY
Alexander & Dowell
ATTORNEYS

United States Patent Office 3,092,729

Patented June 4, 1963

3,092,729

BI-LEVEL AMPLIFIER AND CONTROL DEVICE

Seymour R. Cray, Minneapolis, Minn., assignor to Control Data Corporation, Minneapolis, Minn., a corporation of Minnesota Filed Nov. 3, 1958, Ser. No. 771,428
5 Claims. (Cl. 307—88.5)

The present invention relates to amplifier circuits generally, and specifically to transistor amplifier circuits, adaptable for use in binary signalling circuits, control mechanism, digital computer and data processing devices and systems and digital communication devices and systems, and the like. This invention is an extension of the electronic art and is based on well known electronic principles.

Several distinct types of bi-level circuits appear in the prior art, and these are used for a wide variety of applications including counting, controlling, switching and triggering functions in computing machinery and control systems and the like. Three present examples or types of such bi-level circuits are briefly described as follows, and are arbitrarily designated as "first," "second" and "third" for convenience of reference.

The first, based on the so-called Eccles-Jordan flip-flop, essentially comprises two amplifiers cross-connected by positive feedback through appropriate impedances so that either one amplifier or the other is conducting at any instant of stable operation. Two conditions of stability exist, the conductive state of each amplifier of the circuit being inversely determined by the state of the other amplifier. The Eccles-Jorden type circuit may also be characterized as a bi-level circuit in that the output voltage of one of the two sections is always at one of two levels, high or low, the output voltage of the other section being, reciprocally, at any instant, at one of two levels, either low or high. Since, usually, two reciprocal pairs of output terminals are available, one pair associated with either of the two amplifiers of the circuit, the Eccles-Jordan type circuit is often designated as a two-sided flip-flop.

In a second type of widely used bistable circuits a single amplifier and circuit parameters are so chosen that, with positive feedback, the current-voltage characteristic curve of the overall circuit is S-shaped, with regions of negative slope bounded on either side by regions of positive slope, the circuit having pronounced negative resistance properties. The intersections of the load line with the characteristic curve determine the points of stability at one of two levels, with resulting bi-level high or low output voltage. Since these circuits usually employ only one amplifying device and since they develop output voltage usually at only one pair of output terminals, they are often designated as single-sided or single-amplifier flip-flops.

A third type of bi-level circuit is not bi-stable. In some previously-disclosed single-sided circuits a bi-level output is effected by a "class C" amplifier in which, for example, a low level of output voltage exists when the amplifier is saturated, or a high level of output voltage exists when the amplifier is "cut off" by an appripriate input signal. Thus two states are determined, in which the amplifying device is operating at "cut off" or at saturation, the saturation current representing a relatively large current in terms of the ultimate current carrying capacity of the amplifying device.

The present invention differs from the above and other devices previously known by reason of its configuration of component elements and also in the manner of its operation, as described in the following paragraphs, and as set forth in the appended claims. Basically, the circuit of the present invention is distiguished from previous inventions by the utilization of a single-sided amplifier-inverter circuit in which constant voltage bi-level output conditions are self-determined according to an arrangement by which a considerable amount of the output signal is negatively fed back to the input.

A further novel feature of the present invention which distinguishes it from previously known devices is the use of non-linear or rectifying devices in a negative feed-back circuit which establish distinct limitations on the overall circuit input-output characteristic. The use of the negative feed-back principle, as described, to obtain two distinct regulated output levels is not previously known in the art.

The present invention operates class A, and in this respect further differs from the first and third types mentioned above in that the amplifiers of those circuits operate class C over a wide range of their characteristics, from cut-off to saturation, operating into non-linear regions of their input-output characteristic curves. Circuit parameters are used in the present invention to create a switching circuit in which the amplifying devices are operated over a relatively small range of their linear characteristics, a relatively small input signal causing a relatively small change in amplified output signal, as compared with the input and output signal changes in the first and third circuit types mentioned above. In the present invention, class A dynamic operation is employed over a relatively small range of the total characteristic curve, and is limited to the region of the characteristic input-output curve which is essentially linear.

In the present invention, as will be evident to those skilled in the art, a transistor or transistors may be advantageously used as the amplifier-inverter element, but the scope of this invention is not limited thereto, and the principles described herein extend to any type of device or devices for amplification and inversion.

An advantage of the present invention is that its use facilitates the design and manufacture of signalling circuits, control mechanisms, and digital and logical systems of greater speed simplicity and economy than possible with previous devices.

If a transistor or transistors are used as the amplifier-inverter, another advantage of the present invention is that it minimizes the time delay phenomena due to hole generation and hole storage described in the technical literature pertaining to transistors. The time delay due to hole generation inhibits the build-up of collector current in a transistor amplifier, and the time delay due to hole storage inhibits the decay of collector current. In transistor circuits requiring a wide dynamic range of collector currents, the time delay due to hole generation and hole storage is sufficient to seriously limit the frequency response of the circuit and, thus, to limit its ultimate speed of operation when used in binary counters and the like.

An advantage of the present invention using transistors, is that the transistors operate class A over a relatively small dynamic range of their electrical characteristics, and accordingly there is a relatively small build-up in holes generated in the bi-level transition from the minimum to maximum collector current, and there is a relatively small decay in holes stored in the bi-level transition from maximum to minimum collector current. The relatively small build-up and decay in the circuit of the present invention is accompanied by a significantly smaller time delay due to hole generation and hole storage, compared to the time delay in a circuit operating over a larger dynamic range as, for example, the circuit types cited in the examples above.

In the present invention, the fact that these time delays are smaller permits much higher speed operation of transistors, this being a significant advantage of this invention.

It is, thus, an advantage of the present invention that relatively inexpensive transistors may be used to achieve relatively high speed switching circuits. In the present invention, low-cost so-called "radio-frequency transistors" may be used to achieve, for example, counting rates of five to ten megacycles per second with high reliability. In previous transistorized counting circuits comprising circuit configurations of the types described in the three examples above, for example, in order to achieve equivalent speed performance, it is necessary to use much higher price so-called "switching" transistors; even so, circuit stability and reliability are not achieved to the degree possible with the circuit of the present invention.

A further advantage is that the overall circuit of this invention operates at significantly higher gain than previously known bi-level devices. This is due to the distinguishing fact that the amplifier of the present circuit is operating only in the highest gain region of its input-output characteristics, and is operating only class A.

Accordingly, another advantage and distinguishing feature of the present invention is that relatively small changes in input signal, or relatively small input signal pulses will cause the circuit to advance from one bi-level state to the other as compared with the bi-level devices of previous inventions.

It is a further advantage of the present invention that the use of negative feedback results in far greater stability than achieved in the circuit of the examples above, for example, and the circuit of the present invention is, therefore, much more tolerant of changes of amplifier characteristics, due to aging and other factors. Not only is the circuit of the present invention less affected by changes in the amplifier characteristics, but also it is less affected by changes in the characteristics of the other related circuit parameters which comprise the overall bi-level circuit. It is noted that all bi-stable circuits, as noted in the first and second examples above, are characterized by positive feed-back. The use of negative feedback in a bi-level circuit is unique to the present invention, and results in the advantages noted above.

Another advantage of the circuit of the present invention is that it requires less power, in that it operates over a smaller range of its input-output characteristics, than do previous bi-level circuits.

It is, therefore, the object of this invention to provide novel bi-level single-sided circuits which have all of the advantages set forth above It is a further object of this invention to provide novel bi-level amplifiers and means for direct coupling thereof to provide switching circuits for use in binary logic systems, digital computers, arithmetic accumulators, logical "and" and "or" circuits, and various control systems.

Further objectives of the entire scope of the invention will become apparent in the following detailed description and in the appended claims. The accompanying drawings display the general construction and operational principles of the invention; it is to be understood, however, that said drawings are furnished only by way of illustration and not in limitation thereof.

Figure 3A:
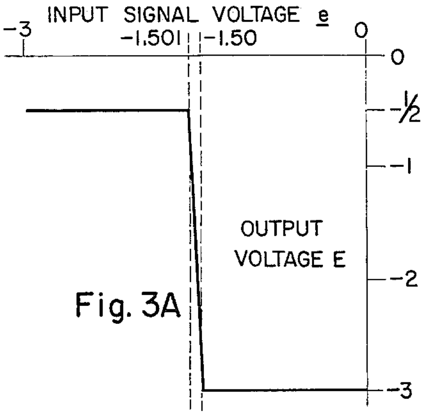
Figures 2, 3B:
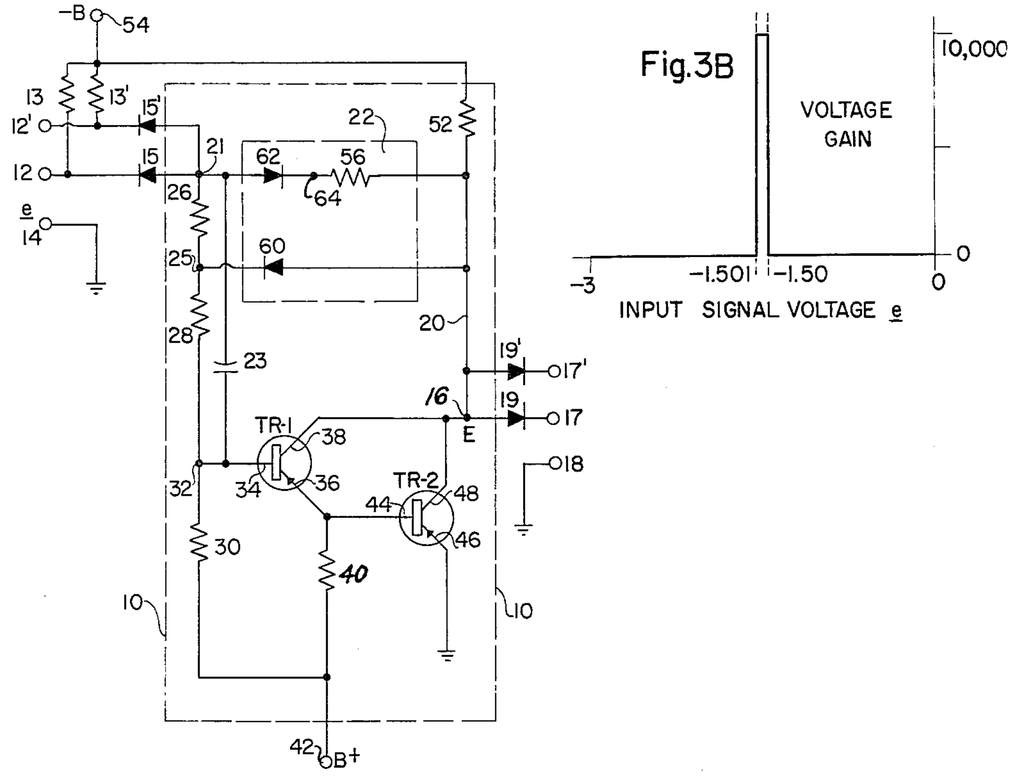
FIG. 2 is a circuit diagram of a preferred form of the invention including input and output coupling diode networks.

FIG. 3A graphically illustrates the input-output character of the circuit of FIG. 2, and FIG. 3B is a related graphical illustration of the relationship of overall circuit voltage gain with respect to input voltage in the circuit of FIG. 2.

Figure 4:
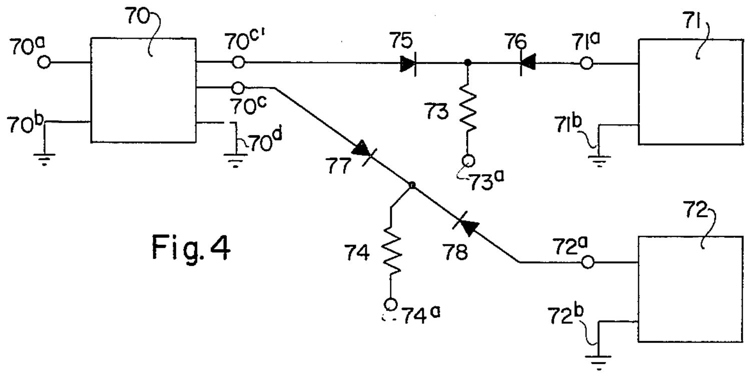

FIG. 4 is a schematic circuit illustrating the coupling of output of a single bi-level circuit to control the inputs to a multiplicity of similar circuits.

Figure 5:
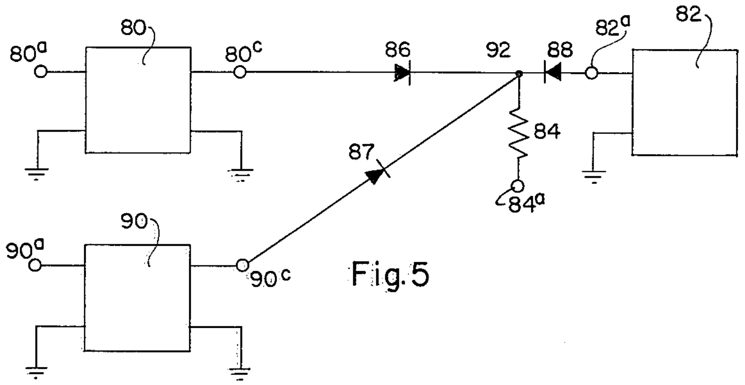

FIG. 5 is a schematic diagram of the circuits of this invention coupled to form a logical "and" circuit.

Figure 6:
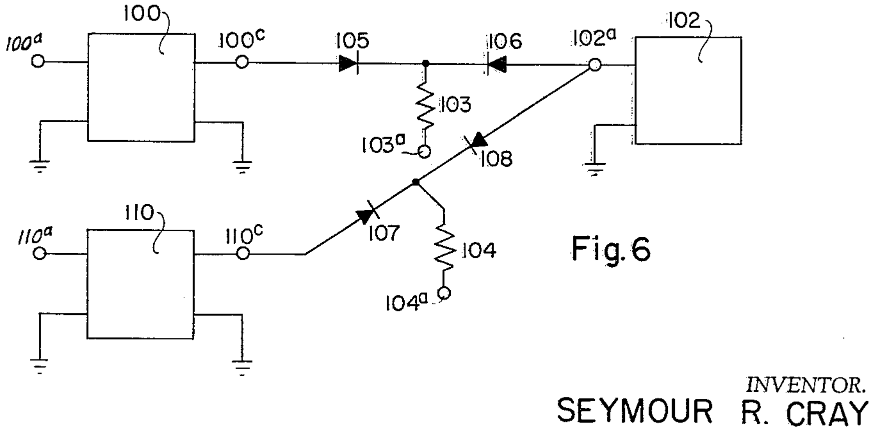

FIG. 6 is a schematic diagram of the circuits of this invention coupled to form a logical "or" circuit.

Figure 7:
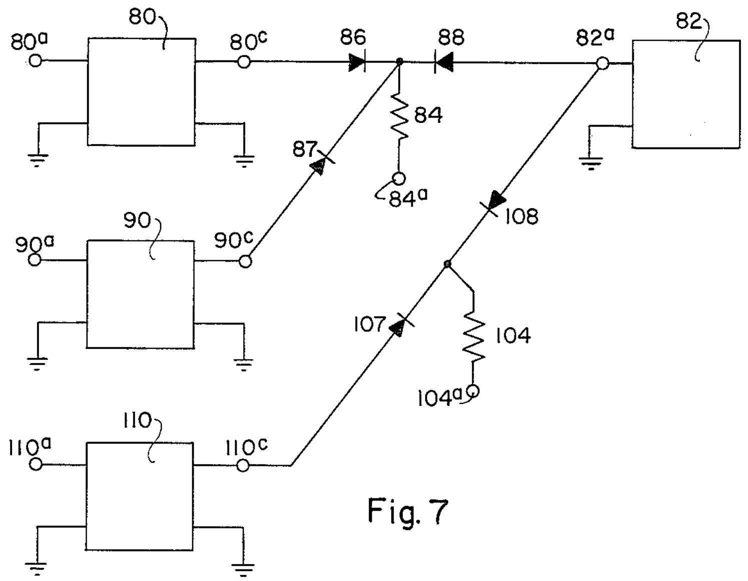

FIG. 7 is a schematic diagram of the circuits of this invention coupled to form a combination logical "and-or" circuit.

Figure 8:
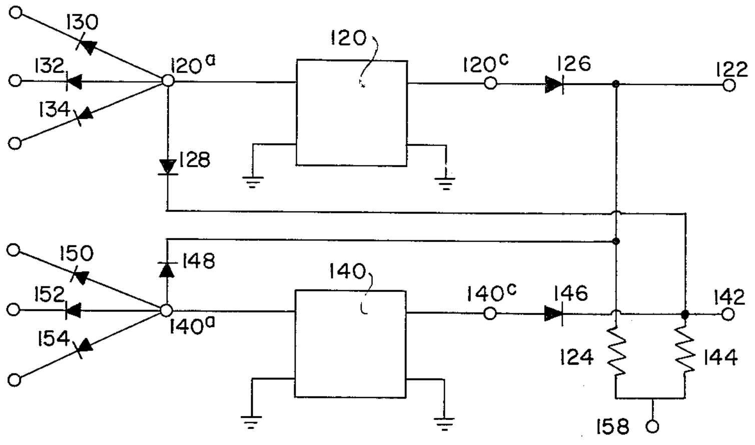

FIG. 8 is a schematic diagram of the circuits of this invention coupled to form a bistable flip-flop.

Figure 1:
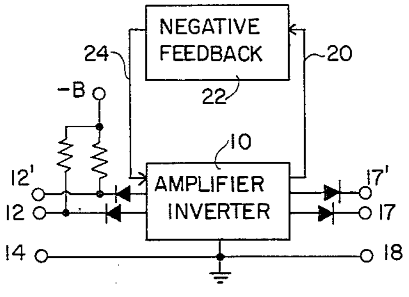
FIGURE 1 is a block diagram illustrating a bi-level circuit according to this invention and having input and output diode couplings.

A simplified block diagram illustrating the principle of this invention is shown in FIGURE 1. The overall circuit comprises most simply an amplifier-inverter 10 and a non-linear negative feedback circuit 22. An input signal is applied between input terminal 12 or 12' and ground terminal 14, and an output signal appears between output terminal 17 and 17' and ground terminal 18. A considerable proportion of the output signal is diverted via line 20 for input to the negative feedback circuit 22, and the output of the negative feedback circuit is then applied via line 24 to the input of the amplifier inverter 10.

FIGURE 2 shows one practical embodiment of a specific bi-level circuit comprising the amplifier-inverter 10 and the non-linear negative feedback circuit 22 of FIGURE 1. The amplifier and inverter elements shown in FIGURE 2 are junction type PNP transistors. As will be apparent to those skilled in the art, the present invention may utilize various types of transistors such as point contact N or P types, or junction type transistors of the NPN or PNP type.

Although the amplifier and inverter are described herein with reference to transistors, the scope of this invention is not limited thereto, and the principles described herein extend to any type of electronic valve or combination of devices to accomplish the overall purpose of amplification and inversion. Moreover, while crystal diodes are used as the non-linear rectifying devices in the feedback circuit, non-linear devices of any type may be used in various other configurations of the invention described herein. The circuit configurations shown in all the figures are by way of example and not of limitation. An operative set of circuit values is provided at the end of this specification, and explanation of the operation of the circuit of FIG. 2 will be made with reference to this practical embodiment of the circuit.

In FIG. 2, a transistor amplifier TR1 is followed by a transistor inverter TR2. These transistors have bases 34 and 44, emitters 36 and 46, and collectors 38 and 48, which elements are analagous to the grids, cathodes and plates, respectively, of electron tubes. Thus, transistor TR1 is used in a circuit analagous to a cathode-follower electron tube amplifier, and drives transistor TR2 which is used in a circuit analagous to an electron-tube inverter and amplifier circuit. By means of these transistor amplifiers a net signal inversion takes place, in addition to amplification. In alternative configurations, a single transistor or electron tube or other device, or a multiplicity or combination of such devices can be used to accomplish these functions.

In FIG. 2, an input signal is applied between input terminal 12 or 12' and ground terminal 14. The input signal is applied through a well known type of diode coupling circuit each including a diode 15 or 15' and a bias resistor 13 or 13', and the input is thereby applied to a voltage divider network comprising resistance 26, 28 and 30, and a divided signal is taken from the network at terminal 32 and applied to transistor base 34. Resistances 26, 28 and 30 also serve as part of a larger voltage divider network serving to establish the proper D.C. potential from positive B supply terminal 42 to transistor base 34. Impedance 26 further functions as an input signal current limiter, also matching the input impedance and terminal 12 voltage of amplifier-inverter stage 10 to the output impedance of a stage ahead, as will be described.

Emitter 36 receives its D.C. potential from +B supply 42 through impedance 40, and any output signal from the first amplifier stage TR1 appears across impedance 40 and is applied as input to inverter transistor stage TR2. Emitter 46 is grounded. Collectors 38 and 48 are connected at terminal 50 and receive their D.C. potential from —B supply terminal 54 through impedance 52. Output signal from the inverter appears across impedance 52 at point 16 where it is at negative potential with respect to ground. Lines 20 and 24 connect to the non-linear negative feedback circuit 22 as will be described. The output appearing at point 16 is then coupled to following stages by coupling diodes 19 or 19' in a well known manner.

The potentials and biases applied to transistors TR1 and TR2 as described above are of such values, and the negative feedback is such that these transistors always operate class A, that is, transistor collectors 38 and 48 draw current under all signal conditions. Circuit parameters are also chosen such that the range of input voltage *e* applied to input terminals 12, 14 causes transistor base 34 to effect a change in the voltage and current of transistor emitter 36 and collector 38 over a relatively small range of values as compared to the range that could be effected. Likewise the circuit parameters are chosen such that the range of voltage from transistor emitter 36 causes transistor base 44 to effect a change in the voltage and current of transistor collector 48 over a relatively small range of values as compared to the range that could be effected. Further, the above circuit parameters and signal conditions are chosen such that the dynamic range of transistor operation is limited to that region of transistor TR1 and TR2 characteristics which is essentially linear and in the region of highest gain.

By thus limiting the dynamic operationl range of transistors TR1 and TR2 the present invention largely minimizes the time-delay phenomena due to hole generation and hole storage which is described in the technical literature pertaining to transistors. Since the transistors TR1 and TR2 operate over a relatively small dynamic range of their total electrical characteristics, there is a relatively small build-up in holes generated in the transition from minimum to maximum collector current, and there is a relatively small decay in the holes stored in the transition from maximum to minimum collecor current. The relatively small build-up and decay in the transistors is accompanied by a significantly small time delay due to hole generation and storage compared to the time delay that would exist if larger dynamic ranges were used. The fact that these time delays are smaller permits very high speed operation of transistors and therefore of the overall circuit of this invention, and this constitutes a significant feature of this invention. The fact that transistors TR1 and TR2 are operating in the highest gain region of their characteristics permits relatively small changes in input signal *e* to terminals 12, 14 to effect relatively larger changes in output signal E at terminals 17, 18 as will be described.

The output signal appearing at amplifier-inverter point 16 is applied via line 20 to the negative feedback circuit 22. Impedance 56 is inserted to create a slight difference in the upper and lower branches of circuit 22, the purpose of which will be evident from the following discussion. If the potential of 16 and 20 increases becoming positive with respect to 25, diode 60 will become conductive and in this low impedance state will, in effect, substantially connect the overall circuit output terminal 16 to point 25 which, except for impedance 26, is equivalent to connecting overall circuit output point 16 to input terminal 12. Thus, a positive increase in output potential 16 will cause the potential of terminal 25 to become more positive.

If, conversely, the potential of 16 goes negative with respect to terminal 25, diode 60 will cease to conduct. When the potential of 16 goes sufficiently negative with respect to 25, the potential of point 64 will become negative with respect to 25 and diode 62 will become conductive and in this low impedance state the circuit comprising impedance 56 and diode 62 will, in effect, substantially connect the overall circuit output point 16 again to input point 21 and thus to point 25. Thus, an increase in output potential in a negative direction will cause the potential of terminal 25 to become more negative. It is apparent, therefore, that both diode feedback paths have a regulating effect on the gain of the overall amplifier-inverter 10. In addition, the resistances 26, 28, 30 and 52 and 56 assume the additional function of establishing proper bias potentials for diodes 60 and 62 in the non-linear negative feedback circuit.

FIG. 3A graphically shows the relationship between output and input voltages in the preferred overall circuit configuration as in FIG. 2. In FIG. 2 the preferred circuit parameters are chosen so that if input signal voltage *e* at terminal 21 is —3 volts with respect to ground terminal 14, output voltage E at point 16 will be —½ volt with respect to ground terminal 18 as shown graphically in FIG. 3. Conversely, if terminal 21 is driven to —½ volt, the output voltage at point 16 becomes —3 volts, and these two sets of input vs. output conditions establish the said bi-level circuit conditions, FIG. 3A.

Assuming a stable supply voltage between —B and +B of forty volts, and assuming the component values listed at the end of this specification, the circuit of FIG. 2 includes a voltage divider chain of resistances beginning at point 21 with resistance 26 and including resistances 28 and 30, the latter being connected to the +B terminal 42. Current is drawn through this chain of resistors from the —B terminal 54 via resistors 13, 13' and 52. In the absence of any input voltage to the terminals 12, 12' the circuit constants are such that the voltage with respect to ground at point 21 is —3 volts. When point 21 is at —3 volts and the circuit is in steady-state condition, the point 32 at the base 34 of transistor TR1 is negative with respect to ground and the transistor TR1 is forwardly biased. Since this transistor is connected at its emitter to the base 44 of transistor TR2, and since the voltage at the emitter 36 is substantially the same as the voltage at base 34 in the common collector configuration, the transistor TR2 is also forwardly biased. The current drawn by the collectors 38 and 48 through the resistor 52 drops the negative voltage at point 16 toward —½ volt.

In the absence of the negative feedback circuit 22, the transistors would draw full saturation current, thus defeating the effort to keep the transistors in a narrow portion of their class A range. However, when point 16 goes less negative than point 25 due to increasing conduction by the transistors, the negative feedback circuit diode 60 become conductive and connects the point 16 to the chain of resistances 28 and 30, thereby reducing the negative forward bias at point 32 and at the base of transistor TR1. When the circuit reaches equilibrium, the voltage at point 16 is —½ volt and the voltage at 21 is —3 volts.

Assume at this time that an input signal is applied to terminal 12 or 12' and that this signal is sufficient to drive point 21 from the above mentioned steady-state value of —3 volts to —½ volt. Thus, the upper end of the chain of resistances 26, 28 and 30 is driven less negative and therefore the forward bias at point 32 and at transistor base 34 is reduced. In the absence of the negative feedback circuit 22, the transistors would be cut off and would stop drawing current so that point 16 would go strongly negative. Here again, the effort to keep the transistors in a narrow portion of their class A range would be defeated. In order to avoid cutting off of these transistors, another negative feedback path is provided including resistances 26 and 56 and diode 62. Upon application of the aforesaid input signal driving the transistors toward cut off, the input points 21 and 25 go less negative, to approximately $-\frac{1}{2}$ volt, and the output point 16 leaves the steady-state value of $-\frac{1}{2}$ volt and goes more negative. Thus the polarity across the feedback circuit 22 reverses and diode 60 becomes nonconductive. However, diode 62 becomes conductive and applies some of the negatively increasing voltage from the output point 16 to the input point 21, thereby tending to restrict the travel of the bias at point 32 in the less negative direction. The values of the resistances 26 and 56 are so chosen that a new state of equilibrium is reached wherein the input voltage at 21 is $-1\frac{1}{2}$ volts and the output voltage at point 16 is $-3$ volts. This condition is stable so long as the input signal remains applied at terminal 12 or 12', but when this signal is removed the circuit returns to the normal steady-state condition initially described.

Thus far, the two regulated output circuit levels have been described, but there is a transitional zone which the circuit passes through when reversing from one level to the other output level. As stated above, when the input-output levels reverse, conductivity in the negative feedback circuit 22 transfers from diode 60 to diode 62, or vice versa. However, during the actual reversal of levels, there comes an instant of substantially equal voltage on both sides of the feedback circuit 22 when neither diode is biased sufficiently to be conductive. During this interval, which will be referred to hereinafter as the transitional zone of the feedback circuit characteristic, and which interval is extremely brief, there is no inverse feedback whatever and the gain of the transistors TR1 and TR2 becomes very great, as shown in FIG. 3B. The gain of the transistors is substantially equal to the product of the beta gain of each transistor and is of the order of 10,000:1. The result is that the transition of the circuit from one level having one negative feedback path to the other level having the other negative feedback path is enormously accelerated by the high gain of the amplifier in the narrow transitional zone, see FIG. 3A.

Thus, the speed of switching of the present system is very high due to the removal of the inverse feedback during transition from one level to the other to decrease transition time, and due to the application of the inverse feedback when the circuit has passed through the transitional zone in order to keep the transistors operating class A over a small increment of the range, and thereby reduce the build-up and decay of the holes. Those skilled in the art will understand that many variations of this novel circuit will achieve the same results. The novelty of this invention primarily relates to the use of a non-linear negative feedback circuit in conjunction with an amplifier-inverter to achieve a circuit with bi-level output characteristics; high speed is achieved in this invention by operating the amplifier-inverter class A, in the high-gain linear portion of the amplifier-inverter characteristics, and, in connection with amplifiers using transistors, by restricting their dynamic operating range to minimize hole build-up and decay.

Those skilled in the art will further understand that there are many uses for such a circuit as described herein. It is useful in replacing binary circuit elements in a wide range of applications including such as those otherwise requiring relay-type contact closures, electron tubes, magnetic amplifier devices, and other transistor circuit configurations. The circuits of this invention are particularly useful in replacing elements of binary signalling circuits as used in control mechanisms, computer and data processing devices and systems, digital communication devices and systems, and the like, as illustrated in the following examples.

It will be noted that in the preferred circuit of FIG. 2 as graphically described by FIGS. 3A and 3B, circuit parameters have been chosen so that the operating range of input voltage applied to terminals 12, 12', 14, is equal to the operating range of output voltage issuing from terminals 17, 17', 18; in the instance of FIG. 3A a $2\frac{1}{2}$ volt range of input voltage amplitudes and output voltage amplitudes is demonstrated. The foregoing permits the output terminals of one overall circuit as described in FIG. 2 to be connected directly to the input terminals of another such circuit so as to form chains of circuits of similar type in the manner to be hereinafter described.

Using appropriate decoupling impedances such as resistors 13 and 13' in FIG. 2 and isolation diodes, such as 15, 15', 19 and 19' as is well known, a single overall circuit such as shown in FIG. 2 may be used to directly control a multiplicity of similar circuits. This is illustrated in FIG. 4 where blocks 70, 71 and 72 each represents a circuit similar to that of FIGS. 1 and 2, with input terminals 70*a*, 70*b*, 71*a*, 71*b*, 72*a* and 72*b* and output terminals 70*c*, 70*c'* and 70*d*. Here, a single bi-level amplifier 70 is used to signal or drive two or more other bi-level amplifiers 71 and 72, through the use of decoupling impedances 73 and 74 biased to —B supply at 73*a* and 74*a*, and using isolation diode rectifiers 75, 76, 77 and 78.

Similarly, a single bi-level amplifier may be controlled by a multiplicity of other bi-level amplifiers using appropriate decoupling impedances. Such circuits are the logical "and" and logical "or" networks of the type widely used in binary signalling circuits and digital communication systems and computer and data processing systems. The bi-level amplifier circuits of the present invention are applicable to such "and" and "or" networks, with superior results compared to those previously obtained. All possible combinations of logical "and" and/or "or" circuits can be obtained by using the bi-level amplifier of the present invention. Following are some examples of the possibilities.

In FIG. 5 a logical "and" network is shown in which the outputs of two or more bi-level amplifiers 80 and 90 are used to signal a single bi-level amplifier 82 through the use of decoupling impedance 84 biased to —B supply at 84*a* and using isolation diode rectifiers 86, 87, 88 as is well known. If both output terminal 80*c* of bi-level amplifier 80 and output terminal 90*c* of bi-level amplifier 90 are $-3$ volts, junction 93 is $-3$ volts and so is input terminal 82*a* of bi-level amplifier 82. If either output terminal 80*c* of bi-level amplifier 80 or output terminal 90*c* of bi-level amplifier 90 is $-\frac{1}{2}$ volt, junction 92 is $-\frac{1}{2}$ volt, as is input terminal 82*a* of bi-level amplifier 82. The size of this logical network may be extended to include 3 or 4 or more bi-level amplifiers such as 80 and 90 which may be similarly connected by their output terminals to the input terminal 82*a* of bi-level amplifier 82.

In FIG. 6 is shown a logical "or" network in which the outputs of two or more bi-level amplifiers 100 or 110 are used to control a single binary amplifier 102 through the use of decoupling impedances 103 and 104 biased to —B supply at 103*a* and 104*a* and using isolation diode rectifiers 105, 106, 107 and 108. If output terminal 100*c* of bi-level amplifier 100, or "or" output terminal 110*c* of bi-level amplifier 110, or if both output terminals are $-3$ volts, then input terminal 102*a* of bi-level amplifier 102 is $-3$ volts. If both output terminal 100*c* of bi-level amplifier 100 and output terminal 110*c* of bi-level amplifier 110 are $-\frac{1}{2}$ volt, then input terminal 102*a* of bi-level amplifier 102 is $-\frac{1}{2}$ volt. The size of this logical network may be extended to include 3 or 4 or more bi-level amplifiers such as 100 and 110 which may be similarly connected by their output terminals to the input terminal 102*a* of bi-level amplifier 102.

In FIG. 7 a logical "and" circuit is shown as was described in FIG. 5, in combination with a logical "or" circuit as was described in FIG. 6. Component numbers are identical to those used in the previous description of FIGS. 5 and 6. The logical "and" circuit is formed by a multiplicity of diodes 86, 87 and 88 into a single decoupling resistor 84. The logical "or" circuit is formed by a multiplicity of diodes as 88, 107 and 108 into the single input 82*a* of bi-level amplifier 82. Operational performance is as described for FIGS. 5 and 6. The overall result is that if both output terminal 80*c* of bi-level amplifier 80, and output terminal 90*c* of bi-level amplifier 90, or if output terminal 110*c* of bi-level amplifier 110 is —3 volts, then the logical result is that the input terminal 82*a* of bi-level amplifier 82 is —3 volts.

It will be noted that, by definition, logical "and" is the inverse of logical "or." Restated, a positive "and" is equivalent to a negative "or" in the bi-level circuits described in the previous paragraphs.

As is well known, two amplifiers may be regeneratively cross-connected in such a way that a change in the output level of one section will produce an opposite change in the output level of the other section. Such a bi-stable bi-level circuit, or flip-flop is discussed earlier in this disclosure. The amplifiers of the present invention make an exceptionally stable flip-flop because of their inherent bi-level nature, and much more stable than similar flip-flops of previous design which comprise amplifiers not inherently bi-level in nature.

A bi-stable flip-flop comprising two regeneratively cross-connected bi-level circuits of the present invention is shown in FIG. 8. Here, output terminal 120 of bi-level amplifier 120 is connected via isolation diodes 126 and 148 to input terminal 140*a* of bi-level amplifier 140. The output terminal 140*c* of bi-level amplifier 140 is similarly cross-connected via isolation diodes 146 and 128 to input terminal 120*a* of bi-level amplifier 120. Output voltage signals are developed across impedances 124 and 144 respectively which are biased to —B supply at 158, and output bi-stable bi-level voltage signals are correspondingly removed at output terminals 122 and 142 respectively; when output terminal 122 is —½ volt, output 142 is —3 volts and vice-versa. The output levels may be "switched," or "triggered" by the application of appropriate input pulses or D.C. voltage levels applied to one or more of a multiplicity of "or" diodes 130, 132 or 134, or 150, 152, or 154 as is well known, using "or" circuits as described in FIG. 6.

As is well known and understood by those skilled in the art, such bi-stable flip-flops as described above and in FIG. 8 can be utilized in many ways including applications otherwise requiring electromechanical relays, vacuum and gas-filled electron tubes, magnetic amplifier and magnetic pulse-storing devices, and other transistor configurations. Such bi-stable flip-flops as described above and in FIG. 8 are particularly useful in replacing commonly used bi-stable elements in binary signalling and storing circuits as used in control mechanisms, computer and data processing devices and systems, digital communication devices and systems, and the like.

For the purpose of illustrating one practical embodiment of the present invention, the following list of components is provided, it being understood that the invention is not limited thereto:

Resistances:
- 13, 13′, 40, 73, 74, 84, 103, 104, 124 and 144 are each 6800 ohms
- 26 is 1000 ohms
- 28 is 220 ohms
- 30 is 22,000 ohms
- 52 is 2200 ohms
- 56 is 1200 ohms capacitor 23 is 220 micromicrofarads, the purpose of which is to speed up the transition.

Diodes 15, 15′, 19, 19′, 60, 62, 75, 76, 77, 78, 86, 87, 88, 105, 106, 107, 108, 126, 128, 130, 132, 134, 150, 152 and 154 are type T1G, Transitron Corp.

Transistors TR1 and TR2 are General Transistor Co. 2N317

It will be understood that the foregoing values, specifications, examples and illustrations are merely illustrative and it is not intended that the invention be limited thereto. Since other configurations and embodiments of this invention will be apparent to others on reading this specification, it is intended that the invention be limited only by the scope of the appended claims.

I claim:

1. A bi-level circuit having two different stable output levels changeable from one level to the other level by application to the circuit of a control signal, the output voltage being less than the control signal voltage at one output level and greater than the control signal voltage at the other output level, and said output levels being separated by an unstable transitional zone occurring during transition between output levels, said circuit being connected to a source of D.C. potential and comprising voltage divider means connected across said source; a direct-current-coupled phase inverting amplifier having an output connected across said source and having an input connected to said voltage divider means and normally biased thereby to establish one of said output levels at which the output voltage bears a certain polarity relationship with respect to the control signal voltage; input terminal means coupled to the voltage divider means to receive said control signal and apply it to the input to the amplifier; a first negative feedback path including a first diode coupled from said output through part of the voltage divider means to said input and disposed to conduct current in one direction therebetween when said first output level bears said certain polarity relationship with respect to the input voltage to regulate said first output voltage to one level and maintain the amplifier within class A operation; and a second negative feedback path including a second diode coupled from said output through a portion of the voltage divider means to said input and conductive in the opposite direction to pass current when the output level bears the opposite polarity relationship with respect to the input voltage to regulate the second output voltage to the other level and maintain the amplifier within class A operation.

2. In a circuit as set forth in claim 1, said control signal having upper and lower input amplitudes substantially inversely equal to said regulated output levels of the amplifier and the transition therebetween occurring when the instantaneous value of the input voltage approximately equals the instantaneous value of the output level, and resistance means in series with one of said diodes and making the total resistance through that path greater than the total resistance through the other path, the degree of difference at least partially determining the voltage separation between said output levels.

3. In a circuit as set forth in claim 1, one of said diodes being connected to a different point on said voltage divider means than the other of said diodes whereby a different resistance appears in one path than in the other, the degree of difference between said output voltage levels being at least partially determined by the difference in resistance in said paths.

4. In a circuit as set forth in claim 1, said amplifier comprising at least one transistor stage, and said feedback diodes substantially directly coupling the output of the amplifier to the input of the amplifier at said output levels, and the diodes having a forward break-down threshold voltage establishing said transitional zone, each diode when conductive limiting the total transistor collector current within a dynamic range which is narrow as compared with the possible amplification range, for the purpose of minimizing transistor switching time delay due to hole and carrier generation and hole and carrier storage effects.

5. In combination, at least two bi-level circuits each as set forth in claim 1, and wherein the difference in values between said upper and lower input levels substantially equals the difference in values between the said corresponding output levels; and the bi-level circuits each having connected therewith a coupling network matching the other circuit such that when the circuits are connected in series, one complete coupling network is formed between each two circuits, one circuit controlling the other circuit to which it is coupled.

References Cited in the file of this patent

UNITED STATES PATENTS

| | | |
|---|---|---|
| 2,663,806 | Darlington | Dec. 22, 1953 |
| 2,715,678 | Barney | Aug. 16, 1955 |
| 2,819,397 | Davis | Jan. 7, 1958 |
| 2,842,625 | Holmes | July 8, 1958 |
| 2,887,542 | Blair et al. | May 19, 1959 |

FOREIGN PATENTS

| | | |
|---|---|---|
| 564,681 | Belgium | Aug. 11, 1958 |
| 864,889 | Germany | Jan. 29, 1953 |
| 1,026,075 | France | Jan. 28, 1953 |
| 1,116,650 | France | Feb. 6, 1956 |